US012598352B2

(12) United States Patent
Chen et al.

(10) Patent No.: US 12,598,352 B2
(45) Date of Patent: Apr. 7, 2026

(54) VIDEO PRESENTATION METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Di Chen, Beijing (CN); Yixin Zheng, Beijing (CN); Sainan Guan, Beijing (CN); Honglin Tao, Beijing (CN); Xiaoyang Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/805,898

(22) Filed: Aug. 15, 2024

(65) Prior Publication Data

US 2024/0414401 A1 Dec. 12, 2024

Related U.S. Application Data

(63) Continuation of application No. PCT/CN2023/075687, filed on Feb. 13, 2023.

(30) Foreign Application Priority Data

Feb. 16, 2022 (CN) .......................... 202210142014.1

(51) Int. Cl.
H04N 21/466 (2011.01)
H04N 21/431 (2011.01)
(52) U.S. Cl.
CPC ..... H04N 21/4668 (2013.01); H04N 21/4316 (2013.01)
(58) Field of Classification Search
CPC .......... H04N 21/4668; H04N 21/4316; H04N 21/47; H04N 21/482; H04N 21/4622;
(Continued)

(56) References Cited

U.S. PATENT DOCUMENTS 6,704,034 B1 3/2004 Rodriguez et al.
8,458,053 B1 * 6/2013 Buron ................ H04N 21/4316
705/26.1

(Continued)

FOREIGN PATENT DOCUMENTS

CN 106775272 A 5/2017
CN 110020122 A 7/2019
(Continued)

OTHER PUBLICATIONS

China National Intellectual Property Administration, Office Action Issued in Application No. 202210142014.1, Jul. 24, 2023, 15 pages.
(Continued)

*Primary Examiner* — Michael R Telan
(74) *Attorney, Agent, or Firm* — Alleman Hall LLP

(57) ABSTRACT

The present disclosure relates to a video presentation method and apparatus, and an electronic device and a storage medium. The method includes: presenting an associated-video recommendation entry in a video playing interface where a first video is presented; and in response to a trigger operation on the associated-video recommendation entry, presenting the video playing interface and an extension panel, wherein the extension panel comprises at least one recommended-video card, the recommended-video card is used for presenting related information of a recommended video, and the recommended video has an association relationship with the first video, and the video playing interface is configured to play the video recommended by the recommended-video card.

17 Claims, 7 Drawing Sheets

(58) Field of Classification Search
CPC ......... H04N 21/42204; H04N 21/4312; H04N 21/478; G06F 3/00; G06F 3/048
See application file for complete search history.

(56)                References Cited

U.S. PATENT DOCUMENTS

| | | | |
|---|---|---|---|
| 9,560,159 B1 | 1/2017 | Lewis et al. | |
| 2005/0160461 A1* | 7/2005 | Baumgartner ..... | H04N 21/2747 348/E7.071 |
| 2008/0066102 A1* | 3/2008 | Abraham ............. | H04N 21/472 348/E5.104 |
| 2008/0244656 A1 | 10/2008 | Sumiyoshi et al. | |
| 2010/0071005 A1* | 3/2010 | Kusunoki .......... | H04N 21/4667 725/46 |
| 2010/0205567 A1* | 8/2010 | Haire ........................ | G06F 8/38 715/840 |
| 2011/0043696 A1 | 2/2011 | Onogi et al. | |
| 2011/0173214 A1* | 7/2011 | Karim ................... | G06F 16/435 707/754 |
| 2012/0311443 A1* | 12/2012 | Chaudhri ............. | G11B 27/105 715/716 |
| 2013/0179925 A1* | 7/2013 | Woods ............... | H04N 21/4222 725/51 |
| 2013/0317635 A1* | 11/2013 | Bates ................... | G06F 3/0482 700/94 |
| 2013/0347018 A1* | 12/2013 | Limp ................. | H04N 21/4394 725/19 |
| 2015/0181279 A1* | 6/2015 | Martch .............. | H04N 21/4349 725/131 |
| 2019/0075340 A1* | 3/2019 | Hochart ............. | H04N 21/4882 |
| 2019/0096439 A1* | 3/2019 | Brouwer .......... | H04N 21/44008 |
| 2019/0349637 A1 | 11/2019 | Bloch et al. | |
| 2020/0396497 A1 | 12/2020 | Liu et al. | |
| 2024/0406488 A1 | 12/2024 | Chen et al. | |

FOREIGN PATENT DOCUMENTS

| | | |
|---|---|---|
| CN | 110941740 A | 3/2020 |
| CN | 111143610 A | 5/2020 |
| CN | 111246245 A | 6/2020 |
| CN | 111783001 A | 10/2020 |
| CN | 112235641 A | 1/2021 |
| CN | 306479693 S | 4/2021 |
| CN | 306587886 S | 6/2021 |
| CN | 113065008 A | 7/2021 |
| CN | 113254136 A | 8/2021 |
| CN | 113259727 A | 8/2021 |
| CN | 113286201 A | 8/2021 |
| CN | 113891164 A | 1/2022 |
| CN | 114449331 A | 5/2022 |
| GB | 2473810 A | 3/2011 |
| JP | 2008187576 A | 8/2008 |
| JP | 2009105835 A | 5/2009 |
| JP | 2009302985 A | 12/2009 |

OTHER PUBLICATIONS

China National Intellectual Property Administration, Patent Grant Issued in Application No. 202210142014.1, Oct. 25, 2023, 10 pages.
ISA China National Intellectual Property Administration, International Search Report Issued in Application No. PCT/CN2023/075687, May 12, 2023, WIPO, 5 pages.
European Patent Office, Extended European Search Report Issued in Application No. 23755752.5, Feb. 21, 2025, Germany, 16 pages.
Japan Patent Office, Office Action Issued in Application No. 2024548371, Nov. 4, 2025, 16 pages.

* cited by examiner

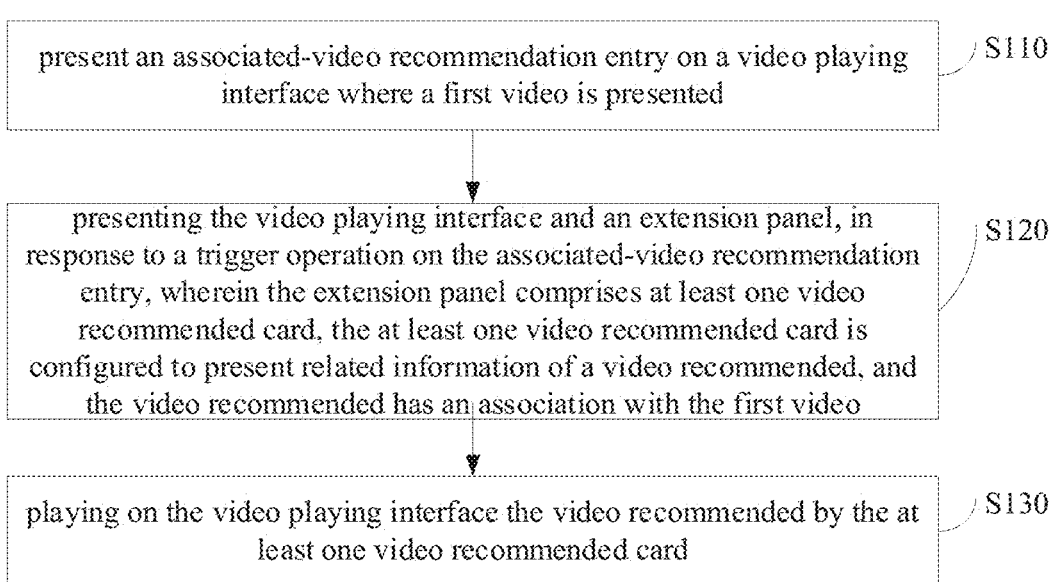

| |
|---|
| present an associated-video recommendation entry on a video playing interface where a first video is presented |

S110

| |
|---|
| presenting the video playing interface and an extension panel, in response to a trigger operation on the associated-video recommendation entry, wherein the extension panel comprises at least one video recommended card, the at least one video recommended card is configured to present related information of a video recommended, and the video recommended has an association with the first video |

S120

| |
|---|
| playing on the video playing interface the video recommended by the at least one video recommended card |

S130

Fig.1 video playing interface associated-video recommendation tag

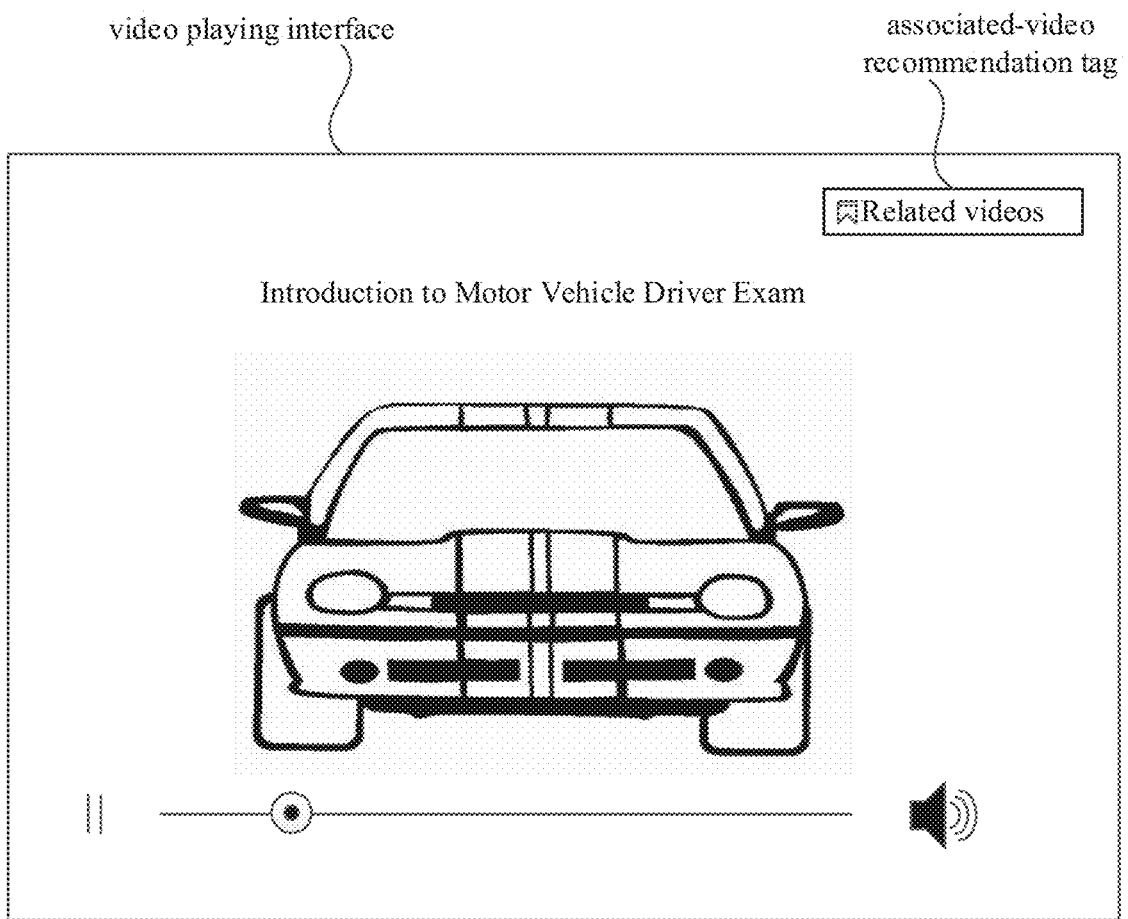

Related videos

Introduction to Motor Vehicle Driver Exam

Fig.2

VIDEO PRESENTATION METHOD AND APPARATUS, AND ELECTRONIC DEVICE AND STORAGE MEDIUM

CROSS-REFERENCE TO RELATED APPLICATIONS

The present disclosure claims priorities to PCT application No. PCT/CN2023/075687, filed on Feb. 13, 2023, which is based on and claims the priority to the Chinese patent application No. 202210142014.1 filed on Feb. 16, 2022, the disclosure of which is incorporated by reference herein in its entirety.

TECHNICAL FIELD

The present disclosure relates to the field of video technology, and in particular, to a video presentation method and apparatus, and an electronic device and a storage medium.

BACKGROUND

With the continuous development of Internet technology, video data recorded and posted by users is gradually enriched, and the number of online videos and the number of users are increasing exponentially.

In the related arts, if a video playing application needs to play a video related to a currently played video, it is usually needed to respond to preset operations many times and perform page jumps, so as to find and play the video related to the currently played video.

SUMMARY

In a first aspect, the present disclosure provides a video presentation method, comprising:

presenting an associated-video recommendation entry on a video playing interface where a first video is presented; and presenting the video playing interface and an extension panel, in response to a trigger operation on the associated-video recommendation entry, wherein the extension panel comprises at least one video recommended card, the at least one video recommended card is configured to present related information of a video recommended, and the video recommended has an association with the first video, and the video playing interface is configured to play the video recommended by the at least one video recommended card.

In a second aspect, the present disclosure further provides a video presentation apparatus, comprising:

a first presentation module configured to present an associated-video recommendation entry on a video playing interface where a first video is presented;

a second presentation module configured to present the video playing interface and an extension panel, in response to a trigger operation on the associated-video recommendation entry, wherein the extension panel comprises at least one video recommended card, the at least one video recommended card is configured to present related information of a video recommended, and the video recommended has an association with the first video; and a playing module configured to play on the video playing interface the video recommended by the at least one video recommended card.

In a third aspect, the present disclosure further provides an electronic device, comprising:

one or more processors; and a storage configured to store one or more programs, the one or more programs, when executed by the one or more processors, causing the one or more processors to implement the video presentation method as described above.

In a fourth aspect, the present disclosure further provides a non-transitory computer-readable storage medium having thereon stored a computer program which, when executed by a processor, implements the video presentation method as described above.

In a fifth aspect, the present disclosure further provides a computer program, comprising: instructions which, when executed by a processor, cause the processor to perform the video presentation method according to any of the embodiments described above.

BRIEF DESCRIPTION OF THE DRAWINGS

The accompanying drawings here, which are incorporated in and constitute a part of this specification, illustrate embodiments consistent with the present disclosure and, together with the description, serve to explain the principles of the present disclosure.

In order to more clearly illustrate technical solutions in the embodiments of the present disclosure or the prior art, the drawings that need to be used in the description of the embodiments or the prior art will be briefly described below, and it is obvious that for those skilled in the art, other drawings can be obtained according to these drawings without paying creative labor.

FIG. 1 is a flow diagram of a video presentation method according to some embodiments of the present disclosure;

FIGS. 2 and 3 are schematic diagrams of a video playing interface according to some embodiments of the present disclosure;

DETAILED DESCRIPTION

Figure 3:
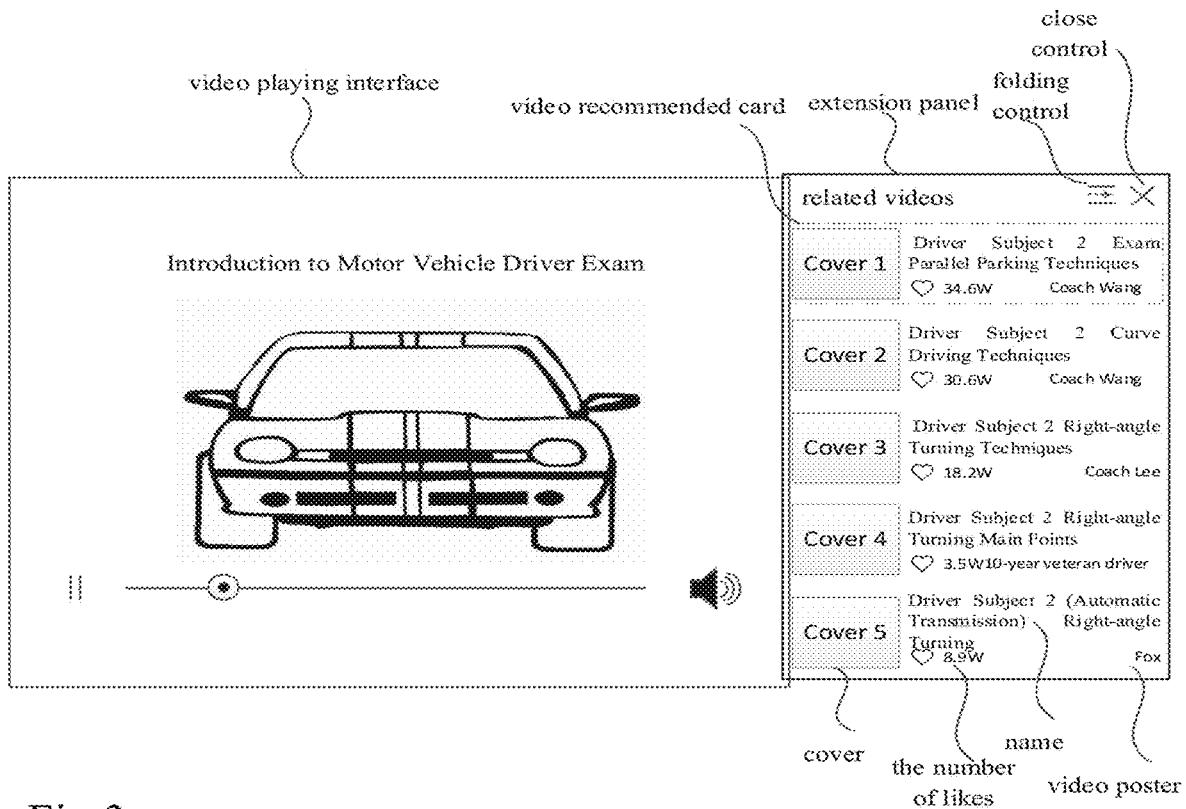

In order that the above objectives, features and advantages of the present disclosure may be more clearly understood, solutions of the present disclosure are further described below. It should be noted that, without conflict, the embodiments of the present disclosure and features in the embodiments may be combined with each other.

In the following description, numerous specific details are set forth in order to provide a thorough understanding of the present disclosure, but the present disclosure may be implemented in other ways different from those described herein; and it is obvious that the embodiments in the description are only a part of the embodiments of the present disclosure, rather than all of them.

In the related arts as mentioned above, technical problems of a large number of page jumps and complex operations. Therefore, in a case where the video related to the currently played video is played, how to reduce the number of page jumps and reduce the complexity of the operations is an urgent problem to be solved at present.

In order to solve or at least partially solve the technical problems, the present disclosure provides a video presentation method and apparatus, and an electronic device and a storage medium.

Compared with the prior arts, the technical solutions provided by the embodiments of the present disclosure have the following advantages:

according to the technical solutions provided by the embodiments of the present disclosure, by in response to a trigger operation on the associated-video recommendation entry, presenting the video playing interface and an extension panel, wherein the extension panel comprises at least one video recommended card, the video recommended card is configured to present related information of a video recommended, and the video recommended has an association with the first video; and playing on the video playing interface the video recommended by the video recommended card, it is capable of quickly playing the video recommended associated with the first video, reducing the number of page jumps, and reducing the operation difficulty.

FIG. 1 is a flow diagram of a video presentation method according to some embodiments of the present disclosure. The embodiments are applicable to a case where video recommendation is performed in a terminal, and this method may be executed by a video presentation apparatus; the apparatus may be implemented in software and/or hardware, and may be configured in an electronic device such as a terminal, which may comprise but is not limited to a smartphone, a palmtop computer, a tablet computer, a wearable device with a display screen, a desktop computer, a notebook computer, an all-in-one machine, a smart home device, and the like.

As shown in FIG. 1, the video presentation method may comprise:

S110, presenting an associated-video recommendation entry on a video playing interface where a first video is presented.

There are many implementations for this step, which are not be limited in this disclosure. For example, in practice, an associated-video recommendation entry may be set, or a plurality of associated-video recommendation entries may be designed, to use different associated-video recommendation entries in different scenes.

In some embodiments, presenting the first video on the video playing interface may involve a plurality of presentation states, such as the first video being played on the video playing interface, or the playback of the first video on the video playing interface being stopped. According to different presentation states, different associated-video recommendation entries may be used. The presentation state of the playback of the first video on the video playing interface being stopped comprises the playback of the first video on the video playing interface being finished, or the playback of the first video on the video playing interface being not finished but being currently paused.

Exemplarily, in response to the first video being played on the video playing interface, the associated-video recommendation entry is an associated-video recommendation tag; and in response to the playback of the first video on the video playing interface being stopped, the associated-video recommendation entry is an associated-video recommendation pop-up window. A size of the associated-video recommendation pop-up window is greater than a size of the associated-video recommendation tag; and the associated-video recommendation pop-up window comprises an associated-video recommendation control and at least one video recommended card. In some embodiments, textual description information about a function of the associated-video recommendation control is presented on the associated-video recommendation control. The reason for this setting is that, at the stage of the first video being played, an associated-video recommendation tag with a smaller size is provided, so that the occlusion of the associated-video recommendation tag on an image of the first video can be sufficiently reduced. At the stage of the playback of the first video being stopped, an associated-video recommendation pop-up window with a larger size is provided to expand the presented information amount.

S120, in response to a trigger operation on the associated-video recommendation entry, presenting the video playing interface and an extension panel, wherein the extension panel comprises at least one video recommended card, the video recommended card is configured to present related information of a video recommended, the video recommended has an association with the first video, and the video playing interface is configured to play the video recommended by the at least one video recommended card.

In practice, due to a fixed size of a terminal display screen, when this step is executed, it is needed to reduce the size of the video playing interface in S110, to free enough display area to present the extension panel. In other words, the size of the video playing interface presented in this step is less than the size of the video playing interface presented in S110. Therefore, when this step is executed, in some embodiments, in response to a trigger operation on the associated-video recommendation entry, a right boundary line of the video playing interface is moved leftwards to a preset position, so that the area of the video playing interface is reduced; and the extension panel is presented on a right side of the video playing interface.

In some embodiments, in practice, an association rule may be pre-constructed; and some videos are designated as videos having an association with the first video according to the association rule. When this method is executed, the designated video is taken as the video recommended.

In some embodiments, the video recommended is a video with the same theme as the first video. Or the video recommended and the first video are videos posted by a same video poster.

In some embodiments, the video recommended is a video that may make supplementary explanations for one or more knowledge points involved in the first video. Exemplarily, the first video introduces a motor vehicle driver exam. The video recommended introduces a specific item (such as ramp fixed-point stop and start, parallel parking, unilateral bridge, curve, right-angle turn, speed limit through wide door, continuous barrier, 100 m shift gears, and rough road driving) in subject 2 of the motor vehicle driver exam.

FIG. 2 and FIG. 3 are schematic diagrams of a video playing interface according to some embodiments of the present disclosure. Referring to FIG. 2, a first video is being played on the video playing interface, and the first video introduces a motor vehicle driver exam. An associated-video recommendation tag is set at an upper right corner of the video playing interface. In response to the associated-video recommendation tag in FIG. 2 being clicked, referring to FIG. 3, a video playing interface and an extension panel are presented. The extension panel comprises a plurality of video recommended cards. Exemplarily, in FIG. 3, the extension panel comprises 5 video recommended cards. A video recommended by each video recommended card introduces a specific item (such as parallel parking, curve, and right-angle turn) of subject 2 in the motor vehicle driver exam. Each video recommended card comprises a cover, a name, the number of likes, and a video poster of the video recommended.

Figure 4:
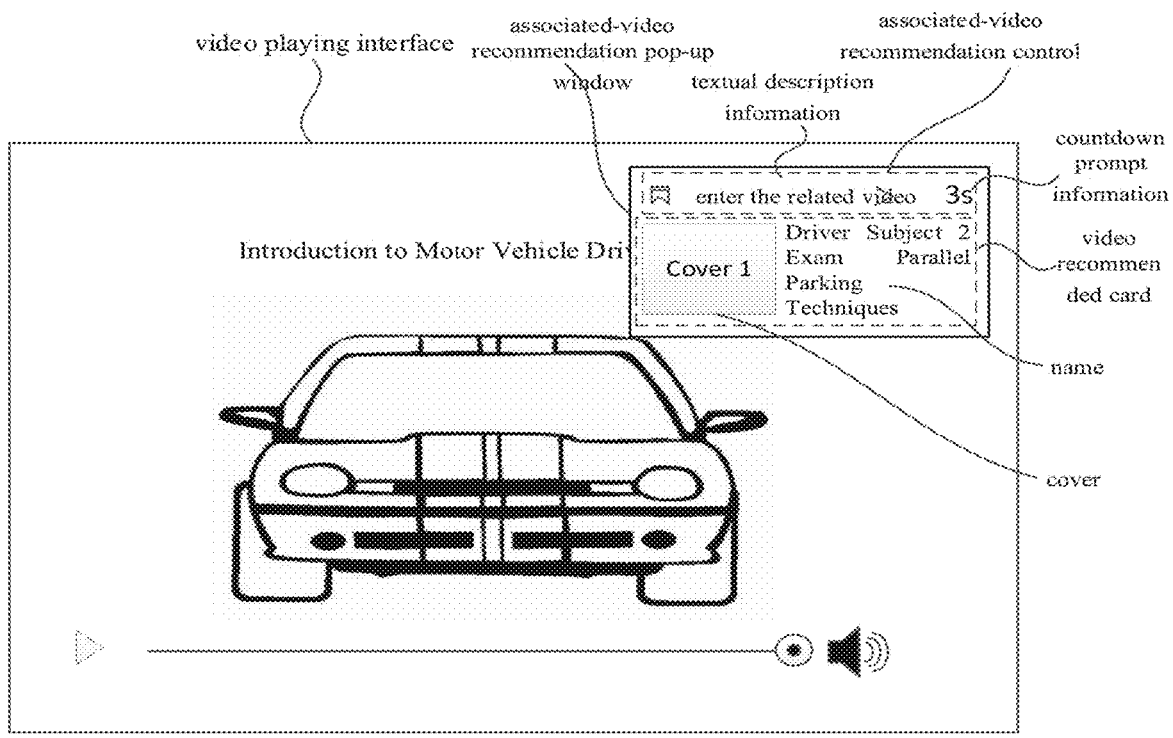
FIGS. 4-5 are schematic diagrams of another video playing interface according to some embodiments of the present disclosure.
Figure 5:
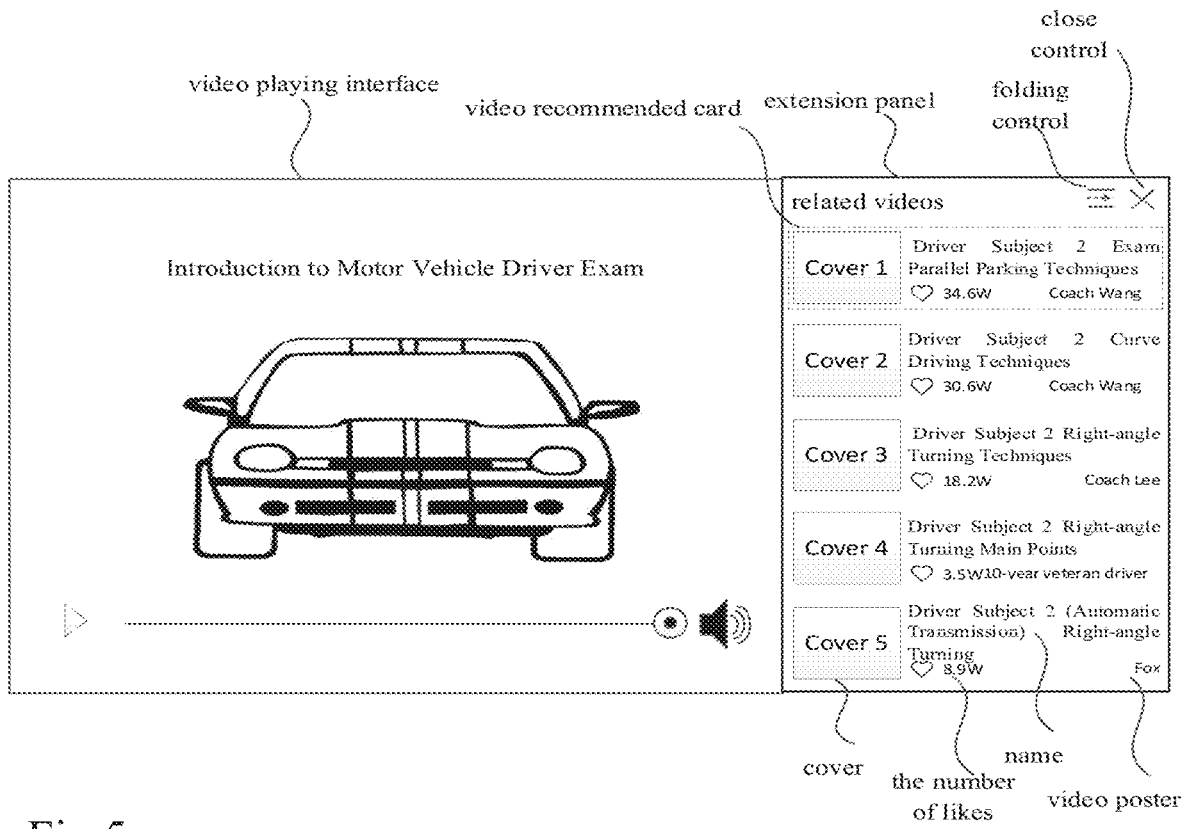

FIGS. 4-5 are schematic diagrams of another video playing interface according to some embodiments of the present disclosure. Referring to FIG. 4, the playback of a first video on the video playing interface is stopped, and the first video introduces a motor vehicle driver exam. An associated-video recommendation pop-up window is presented in an upper right corner of the video playing interface. A size of the associated-video recommendation pop-up window is greater than a size of the associated-video recommendation tag in FIG. 2. The associated-video recommendation pop-up window comprises an associated-video recommendation control and a video recommended card. In response to the associated-video recommendation control in FIG. 4 being clicked, as shown in FIG. 5, a video playing interface and an extension panel are presented. In response to the video recommended card in FIG. 4 being clicked, the video playing interface and the extension panel are presented, and a video played on the video playing interface is a video recommended corresponding to the video recommended card on the associated-video recommendation pop-up window in FIG. 4.

In some embodiments, the following may be further configured: in response to receiving a selection on the associated-video recommendation control within a preset time, presenting the video playing interface and the extension panel; and in response to a selection on the associated-video recommendation control being not received within a preset time, controlling the associated-video recommendation pop-up window to be closed, and presenting the associated-video recommendation tag on the video playing interface.

Figure 6:
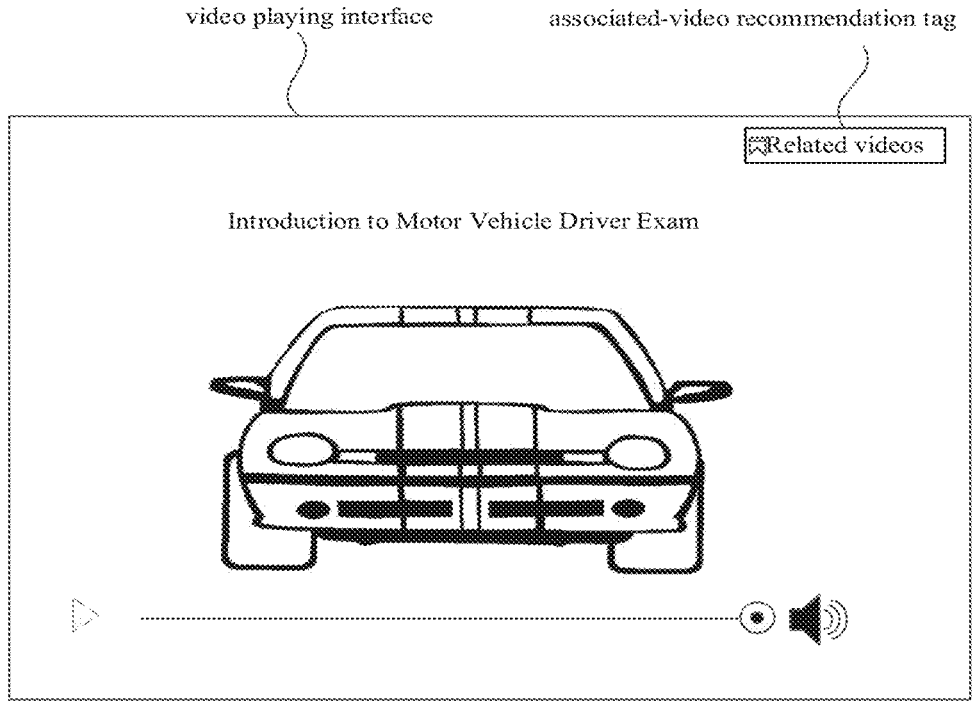
FIG. 6 is a schematic diagram of another video playing interface according to some embodiments of the present disclosure.

FIG. 6 is a schematic diagram of another video playing interface according to some embodiments of the present disclosure. Exemplarily, assuming that a preset time is 5 s, in response to a terminal interface presenting an associated-video recommendation pop-up window, referring to FIG. 4, countdown prompt information is presented on the associated-video recommendation control. Timekeeping starts from the time when the associated-video recommendation pop-up window appears. In response to the associated-video recommendation control in FIG. 4 being clicked within 5 s, as shown in FIG. 5, an extension panel is presented. In response to the associated-video recommendation control in FIG. 4 not being clicked within 5 s, as shown in FIG. 6, an associated-video recommendation pop-up window is closed, and an associated-video recommendation tag is presented on the video playing interface.

In some embodiments, the video presentation method may further comprise: S130, playing on the video playing interface a video recommended by the video recommended card.

There are various implementations for this step, and exemplarily, an implementation for this step may be: in response to a selection operation on a video recommended card on an extension panel, playing, on a video playing interface, a video recommended by the selected video recommended card. The essence of this configuration is that a user is allowed to select videos recommended by video recommended cards, and after the selection of the user, a video selected by the user is played on the video playing interface.

Alternatively, an implementation for this step may be: sequentially playing videos recommended by video recommended cards according to an arrangement order of the video recommended cards in a card presentation area on an extension panel. The essence of this configuration is that in response to the user not selecting the videos recommended by the video recommended cards, the videos recommended are sequentially played according to the arrangement order of the video recommended cards on the extension panel.

Figure 7:
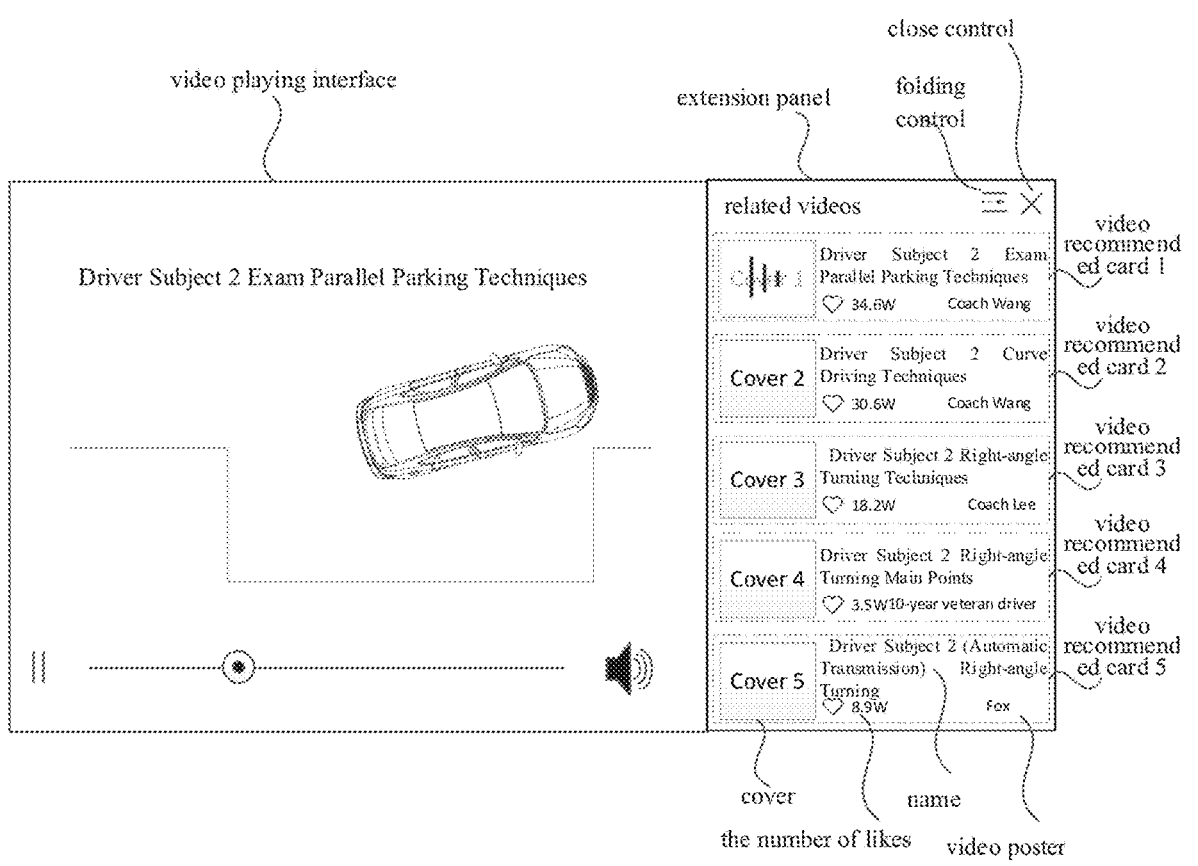
FIGS. 7-8 are schematic diagrams of another video playing interface according to some embodiments of the present disclosure.
Figure 8:
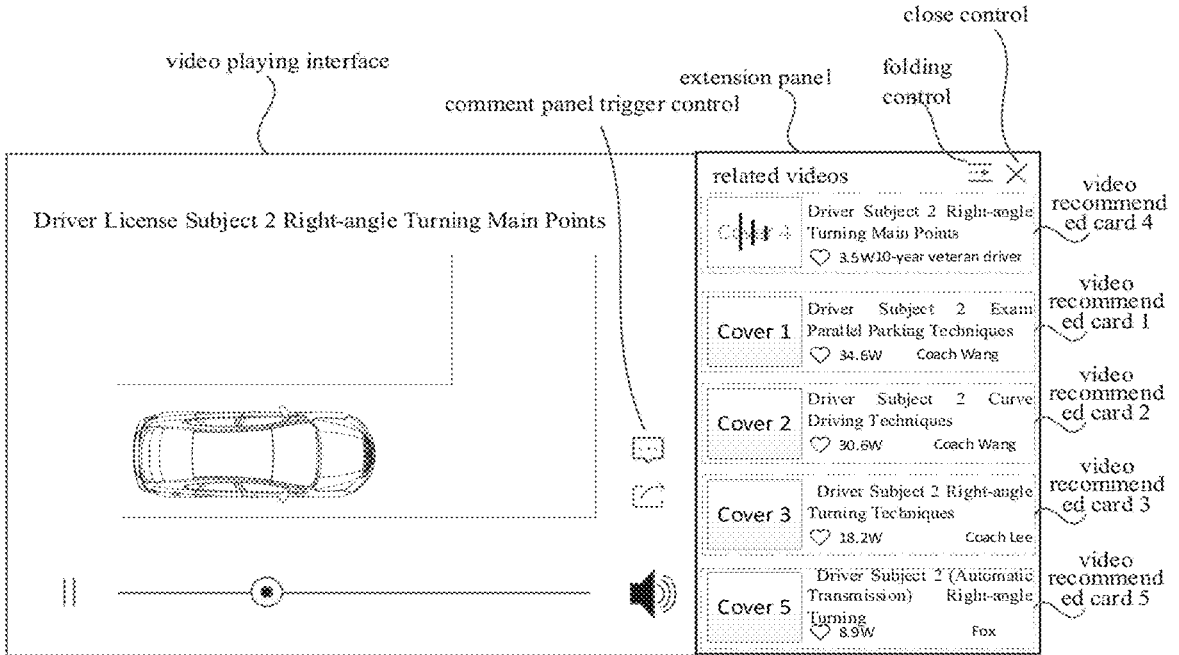

FIGS. 7-8 are schematic diagrams of another video playing interface according to some embodiments of the present disclosure. In response to an extension panel being presented, a video recommended playing mode is entered. In the video recommended playing mode, only a video recommended by a video recommended card is played on the video playing interface.

In the video recommended playing mode, in response to any video recommended card on the extension panel being not clicked, the videos recommended by the video recommended cards are sequentially played according to an arrangement order of the video recommended cards on the extension panel. As shown in FIG. 7, a video recommended by a video recommended card 1 is first played on the video playing interface. After the playback of the video recommended by the video recommended card 1 is finished, a video recommended by a video recommended card 2 is played on the video playing interface. After the playback of the video recommended by the video recommended card 2 is finished, a video recommended by a video recommended card 3 is played on the video playing interface, and so on.

In the video recommended playing mode, in response to a video recommended card on the extension panel being clicked, a video recommended by the clicked video recommended card is played on the video playing interface. Exemplarily, as shown in FIG. 8, in response to a video recommended by a video recommended card 4 being clicked, the video recommended by the video recommended card 4 is played on the video playing interface.

In some embodiments, the following may further be configured: on the video playing interface, in response to the video recommended by the video recommended card being played, arranging the video recommended card corresponding to the currently played video at the top of the card presentation area of the extension panel, and presenting a Playing identification in the video recommended card.

Exemplarily, continuing referring to FIG. 8, the video recommended by the video recommended card 4 is played on the video playing interface, the video recommended card 4 is arranged at the top of the card presentation area of the extension panel, and a Playing identification is presented in the video recommended card 4.

Figure 9:
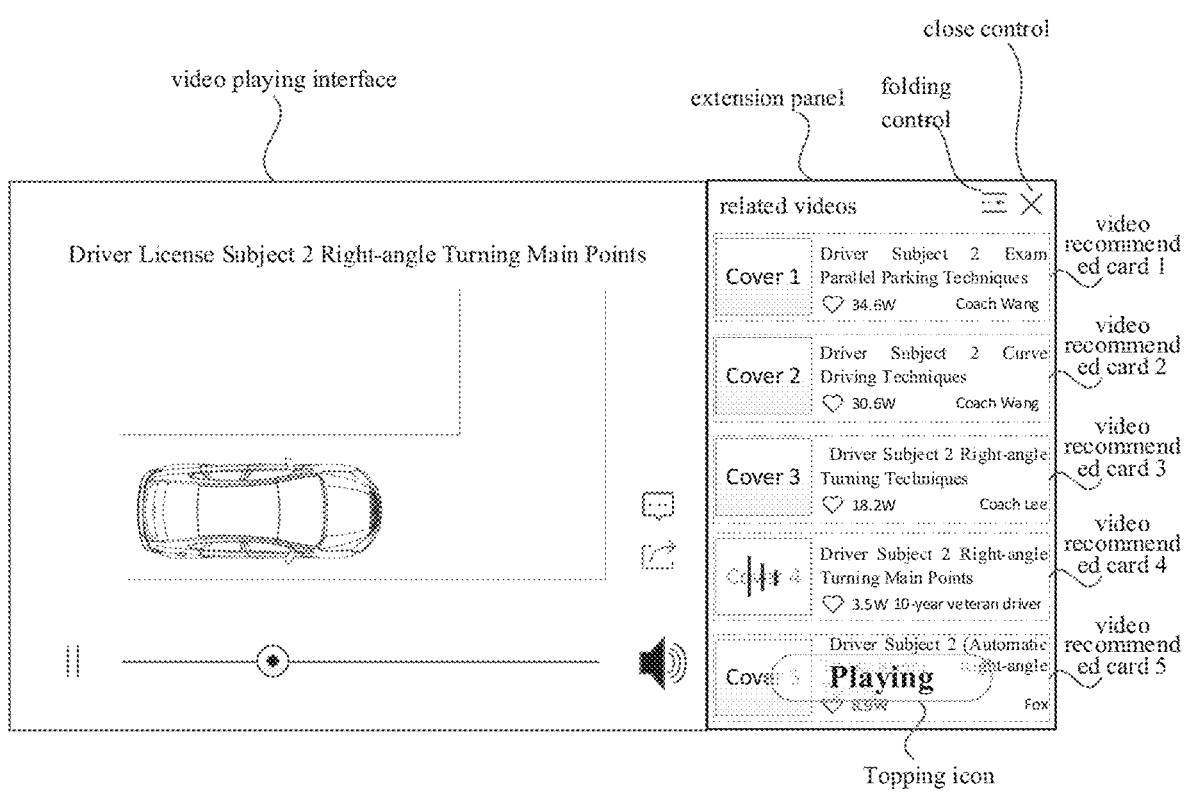
FIG. 9 is a schematic diagram of another video playing interface according to some embodiments of the present disclosure.

In some embodiments, in practice, in response to detecting that the video recommended by the video recommended card is being played on the video playing interface, the video recommended card corresponding to the currently played video is automatically arranged at the top of the card presentation area of the extension panel. FIG. 9 is a schematic diagram of another video playing interface according to some embodiments of the present disclosure. In some embodiments, as shown in FIG. 9, it may be further configured: in response to detecting that a video recommended by a video recommended card is being played on the video playing interface and the video recommended card corresponding to the currently played video is not arranged at the top of the card presentation area of the extension panel, presenting a topping icon. In response to the topping icon being clicked, as shown in FIG. 8, the video recommended card corresponding to the currently played video is arranged at the top of the card presentation area of the extension panel.

By configuring that the video recommended card corresponding to the currently played video is arranged at the top of the card presentation area of the extension panel, the video recommended card corresponding to the currently played video can be highlighted.

According to the technical solution provided by some embodiments of the present disclosure, by in response to a trigger operation on the associated-video recommendation entry, presenting the video playing interface and an extension panel, wherein the extension panel comprises at least one video recommended card, the video recommended card is configured to present related information of a video recommended, and the video recommended has an association with the first video; and playing on the video playing interface the video recommended by the video recommended card, it is capable of quickly playing the video recommended associated with the first video, reducing the number of page jumps, and reducing the operation difficulty.

By configuring that the video recommended is a video which is capable of making supplementary explanations on one or more knowledge points involved in the first video, knowledge transparent transmission can be achieved.

In some embodiments, controlling an associated-video recommendation tag to be closed and presenting the associated-video recommendation pop-up window on the video playing interface, in response to the first video being switched from a being-played state to a being-stopped state on the video playing interface; and/or, controlling the associated-video recommendation pop-up window to be closed and presenting the associated-video recommendation tag on the video playing interface, in response to the first video being switched from the being-stopped state to the being-played state on the video playing interface.

In some embodiments, on the basis of the above technical solutions, in response to an operation for hovering a mouse over a cover of the video recommended in the at least one video recommended card (which may be, in practice, the video recommended card on the extension panel, or the video recommended card on the associated-video recommendation pop-up window), an enlarged cover of the video recommended is presented; and in response to an operation for hovering a mouse over a name of the video recommended in the at least one video recommended card (which may be, in practice, the video recommended card on the extension panel or the video recommended card on the associated-video recommendation pop-up window), a thickened name of the video recommended is presented.

Exemplarily, referring to any one of FIGS. 3-5 and 7-9, in response to an operation for hovering a mouse over a cover of the video recommended in the at least one video recommended card, the cover of the video recommended is enlarged to present the enlarged cover of the video recommended; and in response to an operation for hovering a mouse over a name of the video recommended in the at least one video recommended card, the name of the video recommended is thickened to present the thickened name of the video recommended. The video recommended card selected by the hovering mode can be highlighted by this configuration.

On the basis of the above technical solutions, in some embodiments, the extension panel further comprises a folding control; the extension panel is presented in the folding state, in response to a selection operation on the folding control; or the extension panel is presented in the folding state, in response to a selection operation on a video comment panel, wherein a size of the extension panel in the folding state is less than a size of the extension panel in the non-folding state (i.e., a fully unfolding state); and an amount of information presented by a video recommended card on the extension panel in the folding state is less than an amount of information presented by the video recommended card on the extension panel in the non-folding state.

Figure 10:
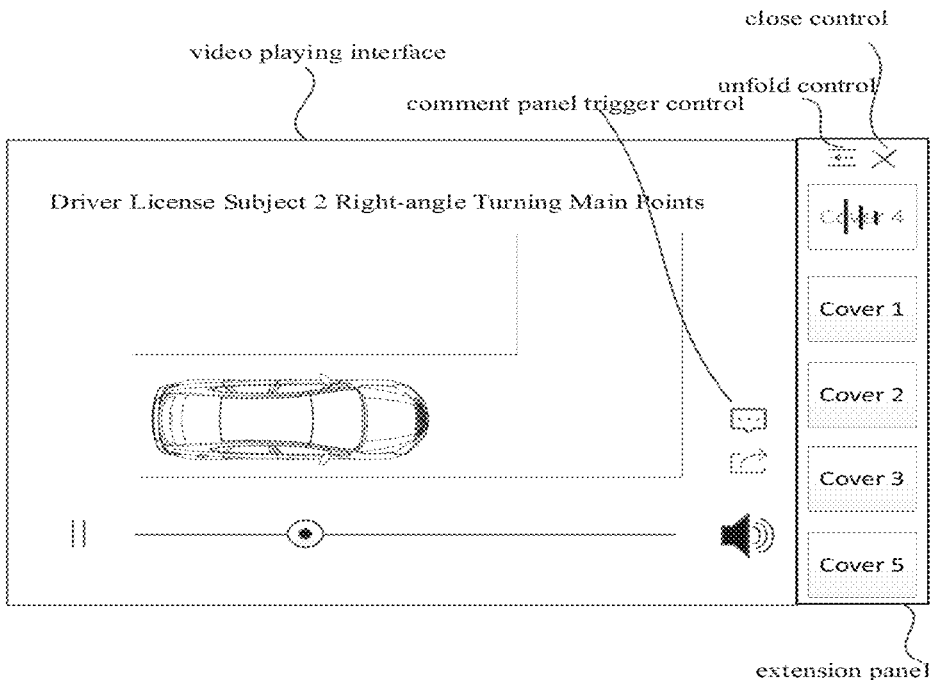
FIGS. 10-11 are schematic diagrams of another video playing interface according to some embodiments of the present disclosure.
Figure 11:
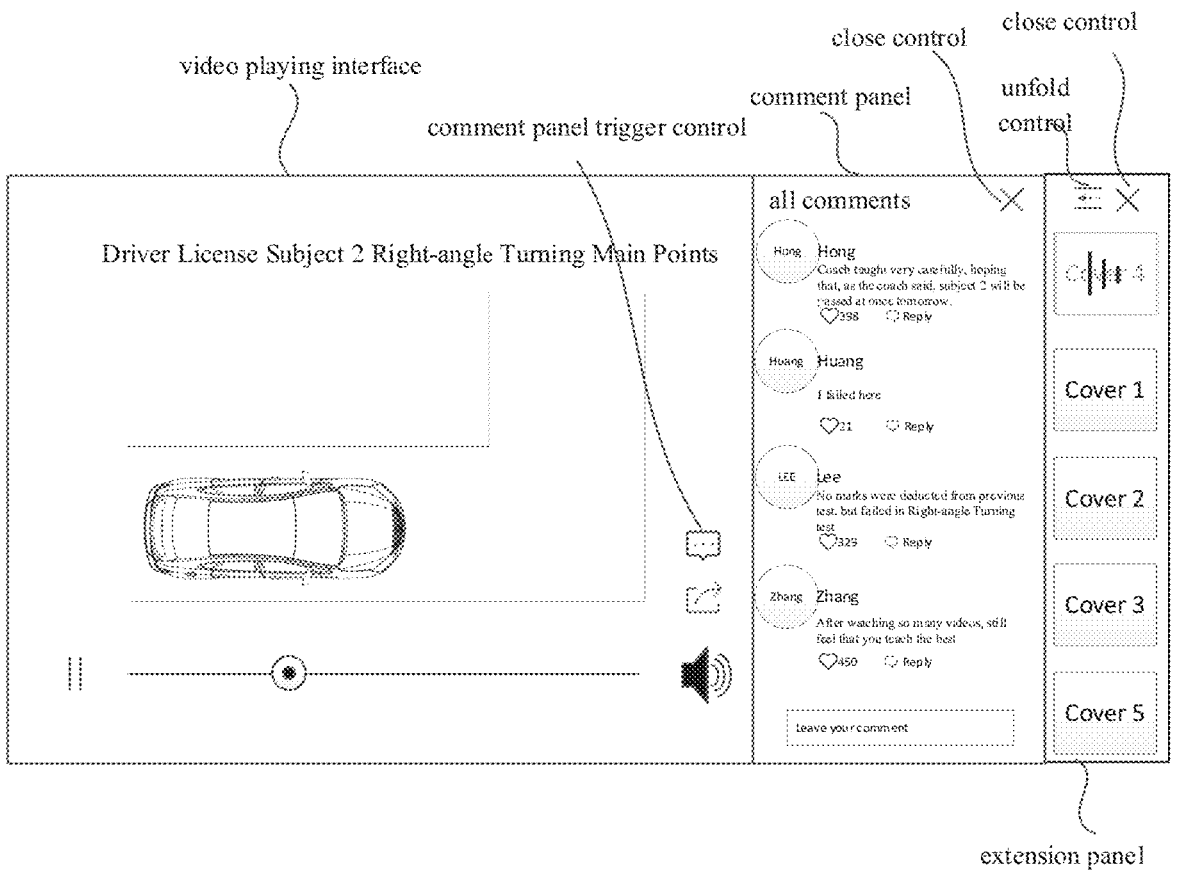

FIGS. 10-11 are schematic diagrams of another video playing interface according to some embodiments of the present disclosure. Exemplarily, the extension panel in FIG. 8 is in a non-folding state, and extension panels in FIGS. 10 and 11 are in a folding state. Referring to FIG. 8, in response to the extension panel being in the non-folding state (i.e., a fully unfolding state), the extension panel comprises a folding control; in response to the folding control being clicked, the extension panel may be switched from the non-folding state to the folding state. Referring to FIG. 10, in response to the extension panel being in the folding state, the extension panel comprises an unfold control, and in response to the unfold control being clicked, the extension panel may be switched from the folding state to the non-folding state.

Continuing referring to FIG. 8, the video playing interface further comprises a comment panel trigger control, and in response to the comment panel trigger control being clicked, as shown in FIG. 11, a comment panel is unfolded, and the extension panel is folded. Continuing referring to FIG. 11, in response to the comment panel trigger control being clicked again, or a close control in the comment panel being clicked, the comment panel is closed, and the extension panel is unfolded.

Because the size of the folded extension panel is less than the size of the extension panel in the non-folding state, the display area of a terminal screen occupied by the extension panel can be reduced, so that the folded extension panel can free more display area for video playback or for presenting the comment panel.

On the basis of the above technical solutions, in some embodiments, the extension panel further comprises a close control; in response to a selection operation on the close control, the extension panel is controlled to be closed, and the associated-video recommendation tag is presented on the video playing interface. Exemplarily, referring to any one of FIGS. 3-5 and 7-9, in response to the close control being clicked, the extension panel is controlled to be closed, that is, the extension panel is no longer displayed, and the associated-video recommendation tag is presented on the video playing interface.

In some embodiments, in response to the extension panel being closed and a video recommended by a video recommended card being played on the video playing interface, after the playback of the video is finished, a playback of any video recommended by any video recommended card on the extension panel is stopped; and in response to the extension panel being closed and the playback of a video recommended by a video recommended card on the video playing interface being just finished, a playback of any video recommended by any video recommended card on the extension panel is stopped. The extension panel being closed means exiting the video recommended playing mode.

Continuing referring to FIG. 8, it is assumed that the video recommended by the video recommended card 4 is being played on the video playing interface. In response to the close control being not clicked, and the video recommended card on the extension panel being not selected, after the playback of the video recommended by the video recommended card 4 is finished, the video recommended by the video recommended card 1 is played on the video playing interface. The close control is clicked, the playback of the video recommended by the video recommended card 4 is continued on the video playing interface, and after the playback of the video recommended by the video recommended card 4 is finished, the playback of the video recommended by the video recommended card 1 is no longer continued, and a playback of a video recommended by another video recommended card than the video recommended card 1 on the extension panel is no longer continued. In response to the close control being clicked after the playback of the video recommended by the video recommended card 4 is finished, a playback of the video recommended by the video recommended card 1 is no longer continued on the video playing interface, and a playback of a video recommended by another video recommended card than the video recommended card 1 on the extension panel is no longer continued.

It should be noted that, for simplicity of explanation for the foregoing method embodiments, they are presented as a series of combinations of actions, but those skilled in the art should appreciate that the present disclosure is not limited by the order of the described actions, as some steps may, according to the present disclosure, be performed in other orders and/or concurrently. Secondly, those skilled in the art should appreciate that the embodiments described in the description are all preferred embodiments and that involved actions and modules are not necessarily required for the present disclosure.

Figure 12:
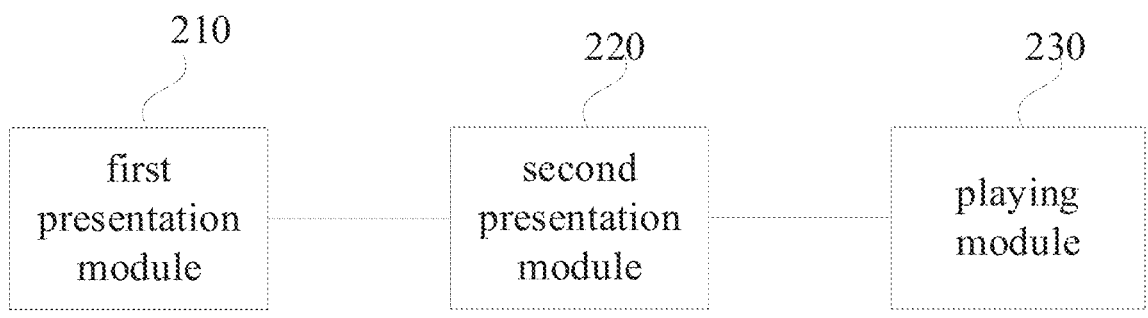
FIG. 12 is a schematic structural diagram of a video presentation apparatus according to some embodiments of the present disclosure.

FIG. 12 is a schematic structural diagram of a video presentation apparatus in some embodiments of the present disclosure. The video presentation apparatus provided by the embodiments of the present disclosure can be configured in a terminal. Referring to FIG. 12, the video presentation apparatus specifically comprises:

a first presentation module 210 configured to present an associated-video recommendation entry on a video playing interface where a first video is presented;

a second presentation module 220 configured to present the video playing interface and an extension panel, in response to a trigger operation on the associated-video recommendation entry, wherein the extension panel comprises at least one video recommended card, the at least one video recommended card is configured to present related information of a video recommended, and the video recommended has an association with the first video; and a playing module 230 configured to play on the video playing interface the video recommended by the at least one video recommended card.

In some embodiments, the different presentation states comprise the first video being played on the video playing interface, the associated-video recommendation entry is an associated-video recommendation tag in response to the first video being played on the video playing interface; and the second presentation module is configured to present the video playing interface and the extension panel, in response to a selection on the associated-video recommendation tag.

In some embodiments, the different presentation states comprise a playback of the first video being stopped on the video playing interface, the associated-video recommendation entry is an associated-video recommendation pop-up window in response to the playback of the first video being stopped on the video playing interface, the associated-video recommendation pop-up window comprises an associated-video recommendation control and at least one video recommended card; and the second presentation module is configured to present the video playing interface and the extension panel, in response to a selection operation on the associated-video recommendation control; or present the video playing interface and the extension panel, in response to a selection operation on the at least one video recommended card on the associated-video recommendation pop-up window, wherein a video played on the video playing interface is a video recommended corresponding to the at least one video recommended card on the associated-video recommendation pop-up window.

In some embodiments, the first presentation module is further configured to:

control the associated-video recommendation pop-up window to be closed and presenting an associated-video recommendation tag on the video playing interface, in response to a selection operation on the associated-video recommendation control not being received within a preset time.

In some embodiments, the apparatus further comprises a switching module configured to:

control an associated-video recommendation tag to be closed and presenting the associated-video recommendation pop-up window on the video playing interface, in response to the first video being switched from a being-played state to a being-stopped state on the video playing interface; and/or control the associated-video recommendation pop-up window to be closed and presenting the associated-video recommendation tag on the video playing interface, in response to the first video being switched from the being-stopped state to the being-played state on the video playing interface.

In some embodiments, the second presentation module is configured to:

present an enlarged cover of the video recommended, in response to an operation for hovering a mouse over a cover of the video recommended in the at least one video recommended card; and/or present a thickened name of the video recommended, in response to an operation for hovering a mouse over a name of the video recommended in the at least one video recommended card.

In some embodiments, the playing module is configured to, in response to the video recommended by the video recommended card being played on the video playing interface, arrange the video recommended card corresponding to the currently played video at the top of a card presentation area of the extension panel, and present a Playing identification in the video recommended card.

In some embodiments, the extension panel further comprises a folding control; and the second presentation module is configured to:

present the extension panel in the folding state, in response to a selection operation on the folding control; or present the extension panel in the folding state, in response to a selection operation on a video comment panel, wherein a size of the extension panel in a folding state is less than a size of the extension panel in a non-folding state, an amount of information presented by a video recommended card on the extension panel in the folding state is less than an amount of information presented by the video recommended card on the extension panel in the non-folding state.

In some embodiments, the extension panel further comprises a close control; and the second presentation module is configured to:

control the extension panel to be closed and presenting an associated-video recommendation tag on the video playing interface, in response to a selection on the close control operation.

In some embodiments, the playing module is configured to:

stop, in response to the extension panel being closed and a video recommended by a video recommended card being played on the video playing interface, a playback of a video recommended by any of the at least one video recommended card on the extension panel, after a playback of the video recommended by the video recommended card is finished; and stop a playback of a video recommended by any of the at least one video recommended card on the extension panel, in response to the extension panel being closed and a playback of a video recommended by a video recommended card on the video playing interface being finished.

The video presentation apparatus provided in some embodiments of the present disclosure may perform the steps of the video presentation method provided in some embodiments of the present disclosure, and has the same or corresponding beneficial effects, which will not be repeated here.

Figure 13:
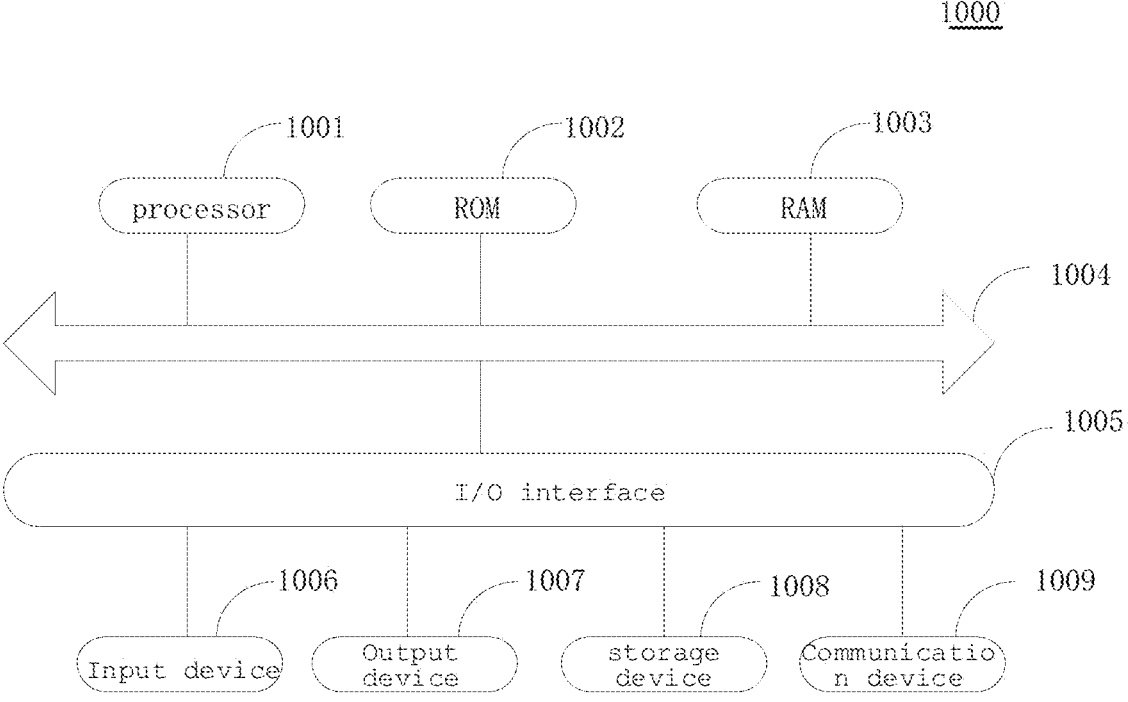
FIG. 13 is a schematic structural diagram of an electronic device according to some embodiments of the present disclosure.

FIG. 13 is a schematic structural diagram of an electronic device in some embodiments of the present disclosure. Referring hereinafter specifically to FIG. 13, it shows a schematic structural diagram suitable for implementing an electronic device 1000 in the embodiments of the present disclosure. The electronic device 1000 in the embodiments of the present disclosure may comprise, but is not limited to, a mobile terminal such as a mobile phone, notebook computer, digital broadcast receiver, PDA (Personal Digital Assistant), PAD (Portable Android Device), PMP (Portable Multimedia Player), vehicle-mounted terminal (e.g., vehicle-mounted navigation terminal), and wearable electronic device, and a fixed terminal such as a digital TV, desktop, and smart home device. The electronic device shown in FIG. 13 is only an example, and should not bring any limitation to the functions and the scope of use of the embodiments of the present disclosure.

As shown in FIG. 13, the electronic device 1000 may comprise a processor (e.g., a central processing unit, a graphics processing unit, etc.) 1001 which may perform various suitable actions and processes according to a program stored in a read-only memory (ROM) 1002 or a program loaded from a storage device 1008 into a random access memory (RAM) 1003 to implement the video presentation method of the embodiment as disclosed in the present disclosure. In the RAM 1003, various programs and information required for the operation of the electronic device 1000 are also stored. The processor 1001, ROM 1002, and RAM 1003 are connected to each other by a bus 1004. An input/output (I/O) interface 1005 is also connected to the bus 1004.

Generally, the following means may be connected to the I/O interface 1005: an input device 1006 comprising, for example, a touch screen, touch pad, keyboard, mouse, camera, microphone, accelerometer, gyroscope, etc.; an output device 1007 comprising, for example, a liquid crystal display (LCD), speaker, vibrator, etc.; the storage device 1008 comprising, for example, a magnetic tape, hard disk, etc.; and a communication device 1009. The communication device 1009 may allow the electronic device 1000 to communicate wirelessly or by wire with other devices to exchange information. While FIG. 13 illustrates the electronic device 1000 having various means, it should be understood that not all illustrated means are required to be implemented or provided. More or fewer means may be alternatively implemented or provided.

In particular, according to the embodiments of the present disclosure, the processes described above with reference to the flow diagrams may be implemented as a computer software program. For example, some embodiments of the present disclosure comprise a computer program product comprising a computer program carried on a non-transitory computer-readable medium, the computer program containing program code for performing the method illustrated by the flow diagram, thereby implementing the video presentation method as described above. In such an embodiment, the computer program may be downloaded and installed from the network through the communication device 1009, or installed from the storage device 1008, or installed from the ROM 1002. The computer program, when executed by the processor 1001, performs the above functions defined in the method of the embodiments of the present disclosure.

It should be noted that the non-transitory above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may comprise an information signal propagated in baseband or as part of a carrier wave, in which computer-readable program code is carried. Such a propagated data signal may take a variety of forms, comprising, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, comprising but not limited to: a wire, an optical cable, RF (Radio Frequency), etc., or any suitable combination of the foregoing.

In some implementations, a client and a server may communicate using any currently known or future developed network protocol, such as HTTP (HyperText Transfer Protocol), and may be interconnected with any form or medium of digital information communication (e.g., a communication network). Examples of the communication network comprise a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has thereon carried one or more programs, where the above one or more programs, when executed by the electronic device, cause the electronic device to:

present an associated-video recommendation entry on a video playing interface where a first video is presented; and in response to a trigger operation on the associated-video recommendation entry, present the video playing interface and an extension panel, wherein the extension panel comprises at least one video recommended card, the video recommended card is configured to present related information of a video recommended, and the video recommended has an association with the first video, and the video playing interface is configured to play the video recommended by the at least one video recommended card.

In some embodiments, when the above one or more programs are executed by the electronic device, the electronic device may also perform other steps according to the above embodiments.

Computer program code for performing the operation of the present disclosure may be written in one or more programming languages or a combination thereof, wherein the above programming language comprises but is not limited to an object-oriented programming language such as Java, Smalltalk, and C++, and also comprises a conventional procedural programming language, such as a "C" language or a similar programming language. The program code may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network, comprising a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which comprises one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved units described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used comprises: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium comprise an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an electronic device, comprising:

one or more processors; and a memory configured to store one or more programs, the one or more programs, when executed by the one or more processors, cause the one or more processors to implement any of the video presentation methods according to the present disclosure.

According to one or more embodiments of the present disclosure, there is provided a non-transitory computer-readable storage medium having thereon stored a computer program which, when executed by a processor, implements any of the video presentation methods according to the present disclosure.

Some embodiments of the present disclosure further provide a computer program product, comprising a computer program or instructions which, when executed by a processor, implement the video presentation method as described above.

The present disclosure further provides a computer program, comprising: instructions which, when executed by a processor, cause the processor to perform the video presentation method according to any of the embodiments described above.

It should be noted that, relational terms such as "first" and "second", herein, are only used for distinguishing one entity or operation from another entity or operation without necessarily requiring or implying any such actual relation or order between these entities or operations. Moreover, the term "comprise", "comprise", or any other variation thereof, is intended to encompass a non-exclusive inclusion, such that a process, method, article, or device comprising a list of elements not only comprises those elements but also comprises other elements not expressly listed, or also comprises elements inherent to such a process, method, article, or device. Without more limitations, an element defined by a statement "comprising a . . . " does not exclude the presence of another identical element in a process, method, article, or device that comprises the element.

The above only describes the specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

The invention claimed is:

1. A video presentation method, comprising:
   presenting an associated-video recommendation entry on a video playing interface where a first video is presented; and
   presenting the video playing interface and an extension panel, in response to a trigger operation on the associated-video recommendation entry, wherein the extension panel comprises at least one video recommended card, the at least one video recommended card is configured to present related information of a video recommended, the video recommended is associated with the first video, and the video playing interface is configured to play the video recommended by the at least one video recommended card, wherein
   the presenting the associated-video recommendation entry on the video playing interface where the first video is presented comprises:
      presenting different associated-video recommendation entries according to different presentation states of the first video,
   the different presentation states comprise the first video being played on the video playing interface and a playback of the first video being stopped on the video playing interface, and
   the different associated-video recommendation entries comprise an associated-video recommendation tag and an associated-video recommendation pop-up window, the associated-video recommendation tag is configured to present the video playing interface and the extension panel, and the associated-video recommendation pop-up window comprises an associated-video recommendation control and at least one video recommended card,
   the associated-video recommendation tag is controlled to be closed and the associated-video recommendation pop-up window is presented on the video playing interface, in response to the first video being switched from a being-played state to a being-stopped state on the video playing interface, and
   the associated-video recommendation pop-up window is controlled to be closed and the associated-video recommendation tag is presented on the video playing interface, in response to the first video being switched from the being-stopped state to the being-played state on the video playing interface.

2. The video presentation method according to claim 1, wherein the associated-video recommendation entry is the associated-video recommendation tag in response to the first video being played on the video playing interface, and
   the presenting the video playing interface and the extension panel, in response to the trigger operation on the associated-video recommendation entry, comprises:
      presenting the video playing interface and the extension panel, in response to a selection on the associated-video recommendation tag.

3. The video presentation method according to claim 1, wherein the associated-video recommendation entry is the associated-video recommendation pop-up window in response to the playback of the first video being stopped on the video playing interface, and
   the presenting the video playing interface and the extension panel, in response to the trigger operation on the associated-video recommendation entry, comprises:
      presenting the video playing interface and the extension panel, in response to a selection operation on the associated-video recommendation control; or
      presenting the video playing interface and the extension panel, in response to a selection operation on the at least one video recommended card on the associated-video recommendation pop-up window, wherein a video played on the video playing interface is a video recommended corresponding to the at least one video recommended card on the associated-video recommendation pop-up window.

4. The video presentation method according to claim 3, wherein textual description information about a function of the associated-video recommendation control is presented on the associated-video recommendation control.

5. The video presentation method according to claim 3, further comprising:
   controlling the associated-video recommendation pop-up window to be closed and presenting the associated-video recommendation tag on the video playing interface, in response to a selection operation on the associated-video recommendation control not being received within a preset time.

6. The video presentation method according to claim 1, further comprising at least one of:
   presenting an enlarged cover of the video recommended, in response to an operation for hovering a mouse over the cover of the video recommended in the at least one video recommended card; or
   presenting a thickened name of the video recommended, in response to an operation for hovering a mouse over the name of the video recommended in the at least one video recommended card.

7. The video presentation method according to claim 1, wherein in response to the video recommended by the at least one video recommended card being played on the video playing interface, the at least one video recommended card corresponding to the video currently played is arranged at a top of a card presentation area of the extension panel and a Playing identification is presented in the at least one video recommended card.

8. The video presentation method according to claim 1, wherein the extension panel further comprises a folding control, a size of the extension panel in a folding state is less than a size of the extension panel in a non-folding state, an amount of information presented by a video recommended card on the extension panel in the folding state is less than an amount of information presented by the video recommended card on the extension panel in the non-folding state, and the video presentation method further comprises:
presenting the extension panel in the folding state, in response to a selection operation on the folding control; or
presenting the extension panel in the folding state, in response to a selection operation on a video comment panel.

9. The video presentation method according to claim 1, wherein the extension panel further comprises a close control, and the video presentation method further comprises:
controlling the extension panel to be closed and presenting the associated-video recommendation tag on the video playing interface, in response to a selection on the close control operation.

10. The video presentation method according to claim 9, further comprising:
stopping, in response to the extension panel being closed and a video recommended by a video recommended card being played on the video playing interface, a playback of a video recommended by any of the at least one video recommended card on the extension panel, after a playback of the video recommended by the video recommended card is finished; and
stopping a playback of a video recommended by any of the at least one video recommended card on the extension panel, in response to the extension panel being closed and a playback of a video recommended by a video recommended card on the video playing interface being finished.

11. The video presentation method according to claim 1, further comprising:
reducing an area of the video playing interface, in response to the trigger operation on the associated-video recommendation entry.

12. An electronic device, comprising:
one or more processors; and
a storage configured to store one or more programs,
the one or more programs, when executed by the one or more processors, causing the one or more processors to implement a video presentation method, comprising:
presenting an associated-video recommendation entry on a video playing interface where a first video is presented; and
presenting the video playing interface and an extension panel, in response to a trigger operation on the associated-video recommendation entry, wherein the extension panel comprises at least one video recommended card, the at least one video recommended card is configured to present related information of a video recommended, the video recommended is associated with the first video, and the video playing interface is configured to play the video recommended by the at least one video recommended card, wherein
the presenting the associated-video recommendation entry on the video playing interface where the first video is presented comprises:

presenting different associated-video recommendation entries according to different presentation states of the first video,
the different presentation states comprise the first video being played on the video playing interface and a playback of the first video being stopped on the video playing interface,
the different associated-video recommendation entries comprise an associated-video recommendation tag and an associated-video recommendation pop-up window, the associated-video recommendation tag is configured to present the video playing interface and the extension panel, and the associated-video recommendation pop-up window comprises an associated-video recommendation control and at least one video recommended card,
the associated-video recommendation tag is controlled to be closed and the associated-video recommendation pop-up window is presented on the video playing interface, in response to the first video being switched from a being-played state to a being-stopped state on the video playing interface, and
the associated-video recommendation pop-up window is controlled to be closed and the associated-video recommendation tag is presented on the video playing interface, in response to the first video being switched from the being-stopped state to the being-played state on the video playing interface.

13. The electronic device according to claim 12, wherein the associated-video recommendation entry is the associated-video recommendation tag in response to the first video being played on the video playing interface, and the one or more processors implements following steps:
presenting the video playing interface and the extension panel, in response to a selection on the associated-video recommendation tag.

14. The electronic device according to claim 12, wherein the associated-video recommendation entry is the associated-video recommendation pop-up window in response to the playback of the first video being stopped on the video playing interface, and the one or more processors implements following steps:
presenting the video playing interface and the extension panel, in response to a selection operation on the associated-video recommendation control; or
presenting the video playing interface and the extension panel, in response to a selection operation on the at least one video recommended card on the associated-video recommendation pop-up window, a video played on the video playing interface being a video recommended corresponding to the at least one video recommended card on the associated-video recommendation pop-up window.

15. The electronic device according to claim 14, wherein textual description information about a function of the associated-video recommendation control is presented on the associated-video recommendation control.

16. The electronic device according to claim 14, wherein the one or more processors implements following steps:
controlling the associated-video recommendation pop-up window to be closed and presenting the associated-video recommendation tag on the video playing interface, in response to a selection operation on the associated-video recommendation control not being received within a preset time.

17. A non-transitory computer-readable storage medium having thereon stored a computer program which, when executed by a processor, implements a video presentation method, comprising:

presenting an associated-video recommendation entry on a video playing interface where a first video is presented; and presenting the video playing interface and an extension panel, in response to a trigger operation on the associated-video recommendation entry, wherein the extension panel comprises at least one video recommended card, the at least one video recommended card is configured to present related information of a video recommended, the video recommended is associated with the first video, and the video playing interface is configured to play the video recommended by the at least one video recommended card, wherein the presenting the associated-video recommendation entry on the video playing interface where the first video is presented comprises:

presenting different associated-video recommendation entries according to different presentation states of the first video, the different presentation states comprise the first video being played on the video playing interface and a playback of the first video being stopped on the video playing interface, the different associated-video recommendation entries comprise an associated-video recommendation tag and an associated-video recommendation pop-up window, the associated-video recommendation tag is configured to present the video playing interface and the extension panel, and the associated-video recommendation pop-up window comprises an associated-video recommendation control and at least one video recommended card, the associated-video recommendation tag is controlled to be closed and the associated-video recommendation pop-up window is presented on the video playing interface, in response to the first video being switched from a being-played state to a being-stopped state on the video playing interface, and the associated-video recommendation pop-up window is controlled to be closed and the associated-video recommendation tag is presented on the video playing interface, in response to the first video being switched from the being-stopped state to the being-played state on the video playing interface.

* * * * *